United States Patent
Watts et al.

(10) Patent No.: US 6,431,498 B1
(45) Date of Patent: Aug. 13, 2002

(54) SCALLOPED WING LEADING EDGE

(76) Inventors: Philip Watts, 5355 E. La Pasada, #22, Long Beach, CA (US) 90815; Frank E. Fish, 1113 Winchester Trail, Downington, PA (US) 19335

(*) Notice: Subject to any disclaimer, the term of this patent is extended or adjusted under 35 U.S.C. 154(b) by 0 days.

(21) Appl. No.: 09/607,872

(22) Filed: Jun. 30, 2000

(51) Int. Cl.$^7$ .................................................. B64C 3/28
(52) U.S. Cl. ...................................... 244/198; 244/200
(58) Field of Search ............................ 244/34 R, 35 R, 244/198, 199, 200, 204, 214, 216, 119, 123

(56) References Cited

U.S. PATENT DOCUMENTS

| | | | |
|---|---|---|---|
| 1,724,456 A | * | 8/1929 | Crook |
| 1,734,801 A | * | 11/1929 | Friese |
| 1,773,280 A | * | 8/1930 | Scott .......................... 244/200 |
| 1,840,902 A | * | 1/1932 | Hicks |
| 1,896,336 A | | 2/1933 | Vaile |
| 2,272,358 A | * | 2/1942 | Steinhaus .................... 170/172 |
| 2,358,985 A | * | 9/1944 | McAndrew .................... 244/40 |
| 2,426,334 A | * | 8/1947 | Banning, Jr. ................ 244/41 |
| 2,800,291 A | | 7/1957 | Stephens ..................... 244/41 |
| 2,967,030 A | * | 1/1961 | Whitcomb ..................... 244/41 |
| 3,370,810 A | | 2/1968 | Shevell et al. ............... 244/41 |
| 3,568,956 A | | 3/1971 | Swanson ...................... 244/41 |
| 4,067,518 A | | 1/1978 | Paterson et al. ............. 244/130 |
| 4,323,209 A | | 4/1982 | Thompson ................... 244/199 |
| 4,429,843 A | * | 2/1984 | Thompson ................... 244/199 |
| 4,915,327 A | * | 4/1990 | Ellmers et al. ............. 244/210 |
| 5,114,099 A | * | 5/1992 | Gao .......................... 244/130 |
| 5,205,519 A | | 4/1993 | Creel ......................... 244/198 |
| 5,366,180 A | | 11/1994 | Wainfan et al. ........... 244/45 A |
| 5,755,408 A | | 5/1998 | Schmidt et al. ............. 244/204 |

FOREIGN PATENT DOCUMENTS

| | | | | |
|---|---|---|---|---|
| FR | 656859 | * | 5/1929 | .................. 244/200 |
| GB | 190506 | * | 1/1923 | .................. 244/200 |
| IT | 479694 | * | 4/1953 | |

OTHER PUBLICATIONS

Fish, Frank E., "Performance Constraints on the Maneuverability of Flexible and Rigid Biological Systems," *Proceedings of the Eleventh International Symposium on Unmanned Untethered Submersible Technology*, Aug. 1999, pp. 394–406.

Hoerner, S.F., "Fluid–Dynamic Drag," *Leading Edge Devices*, 1965, p. 19.

Fish, Frank E., "Imaginative Solutions by Marine Organisms for Drag Reduction," *Proceedings of the International Symposium on Seawater Drag Reduction*, 1998, pp. 1–8.

Fish, Frank E. and Battle, Juliann M., Hydrodynamic Design of the Humpback Whale Flipper, *Journal of Morphology*, 1995, pp. 51–60.

Bushnell, D. M. and Moore, K. J., "Drag Reduction in Nature," *Annu. Rev. Fluid Mech.*, 1991, pp. 65–79.

* cited by examiner

*Primary Examiner*—Michael J. Carone
*Assistant Examiner*—Gabriel S Sukman
(74) *Attorney, Agent, or Firm*—Law Office of John A. Griecci

(57) ABSTRACT

An apparatus to modify a wing to provide increased lift over drag ratios compared to similar wings with straight leading edges. For wings extending in a lateral direction, and defining a longitudinal upstream direction, the apparatus forms a laterally extending leading edge facing in the upstream direction. The apparatus forms a plurality of protrusions spaced laterally along the leading edge, the protrusions creating a smoothly varying, alternately forward-and-aft sweep along the leading edge relative to the upstream flow direction along the leading edge.

29 Claims, 5 Drawing Sheets

SCALLOPED WING LEADING EDGE

BACKGROUND OF THE INVENTION

This invention relates generally to a streamlined body (e.g., a wing having an airfoil cross-section) and, more particularly, to a streamlined body having a leading edge configured to maximize the body's lift while minimizing the body's drag.

Designing the lift over drag ratio of a wing (or other streamlined body) for the efficient production of lift, while producing a minimal level of drag, is a normal aspiration for a wing designer. The efficiency of a wing directly correlates to the overall fuel required for a flight, which can significantly impact the overall cost of operating an aircraft. Therefore, it is highly desirable to have an apparatus for improving the efficiency of a wing.

Numerous types of apparatus have been designed to affect the aerodynamics of wings. Many of these apparatus can be divided into three categories: slats; strakes and vortex generators. Slats are deployable leading edge devices that enlarge the wing area to increase lift. Typically a slat will extend the leading edge of the wing in a forward and downward direction to increase both the chord and the effective thickness or camber of the wing. The extension and/or retraction of a slat can be driven either by an actuator or by aerodynamic forces. Slats are found on most commercial aircraft and are used primarily during landing. While slats do increase lift, they also appreciably increase drag. Furthermore, slats are active devices, adding significantly to the cost of manufacturing and maintaining the wing.

Strakes are a category of typically passive fin-type devices that generally extend from the leading edge of a wing or other aerodynamic structure. Strakes are used for any of a variety of reasons relating to controlling the flow of air over a wing. Depending on the manner in which they are used, strakes can be used to modify airflow so as to either increase the wing's lift or decrease the wing's drag. However, the use of strakes is primarily limited to aerodynamic structures that have airflow occurring in undesirable patterns along the surface of the structure.

Vortex generators are typically small protrusions across the airflow that are generally placed on the low pressure side of an airfoil. As indicated by their name, the vortex generators typically have discontinuities that create vortices. Typically these vortices help maintain a boundary layer of flowing air attached to the wing. When the air separates, it causes wing stall, loss of vehicle control, and catastrophic crashes. Vortex generators cause additional parasitic drag.

Accordingly, there has existed a definite need for an apparatus for improving the efficiency of a streamlined body, and to related methods. The present invention satisfies these and other needs, and provides further related advantages.

SUMMARY OF THE INVENTION

The present invention provides apparatus and methods for improving the efficiency of a streamlined body, such as a wing. The invention typically provides for increased lift over drag ratios compared to similar streamlined bodies with straight leading edges.

Wings are bodies that extend in a (generally) lateral direction, and define a longitudinal upstream direction. They have a laterally extending leading edge facing (generally) in the upstream direction. Other streamlined bodies can similarly be said to extend laterally, defining a leading edge facing (generally) in an longitudinally upstream direction.

The invention features a plurality of protrusions spaced laterally along the leading edge, the protrusions creating a smoothly varying, alternately forward and rearward sweep (or greater and lesser sweep) along the leading edge (relative to the upstream flow direction along the leading edge). An advantage of this feature, in the inventors' belief, is that it creates lateral air flow along the leading edge of the streamlined body, thereby limiting the creation of high static pressure stagnation points along the leading edge. Furthermore, it introduces streamwise vortices near the leading edge, and lowers tip vortex strength and the related induced drag by compartmentalizing low pressure regions.

Another feature of the invention is that the protrusions are preferably separable from the remainder of the laterally extending wing and/or streamlined body. This feature advantageously allows the protrusions to be manufactured separately from, and even significantly after, the manufacture of the remainder of the streamlined body. It also potentially allows the protrusions to be lightweight structures that can be structurally supported by the streamlined body. Preferably, it is inexpensive, non-load bearing, and held in place by fluid-dynamic forces.

Other features and advantages of the invention will become apparent from the following detailed description of the preferred embodiments, taken in conjunction with the accompanying drawings, which illustrate, by way of example, the principles of the invention.

DETAILED DESCRIPTION OF THE PREFERRED EMBODIMENTS

Figure 1A:
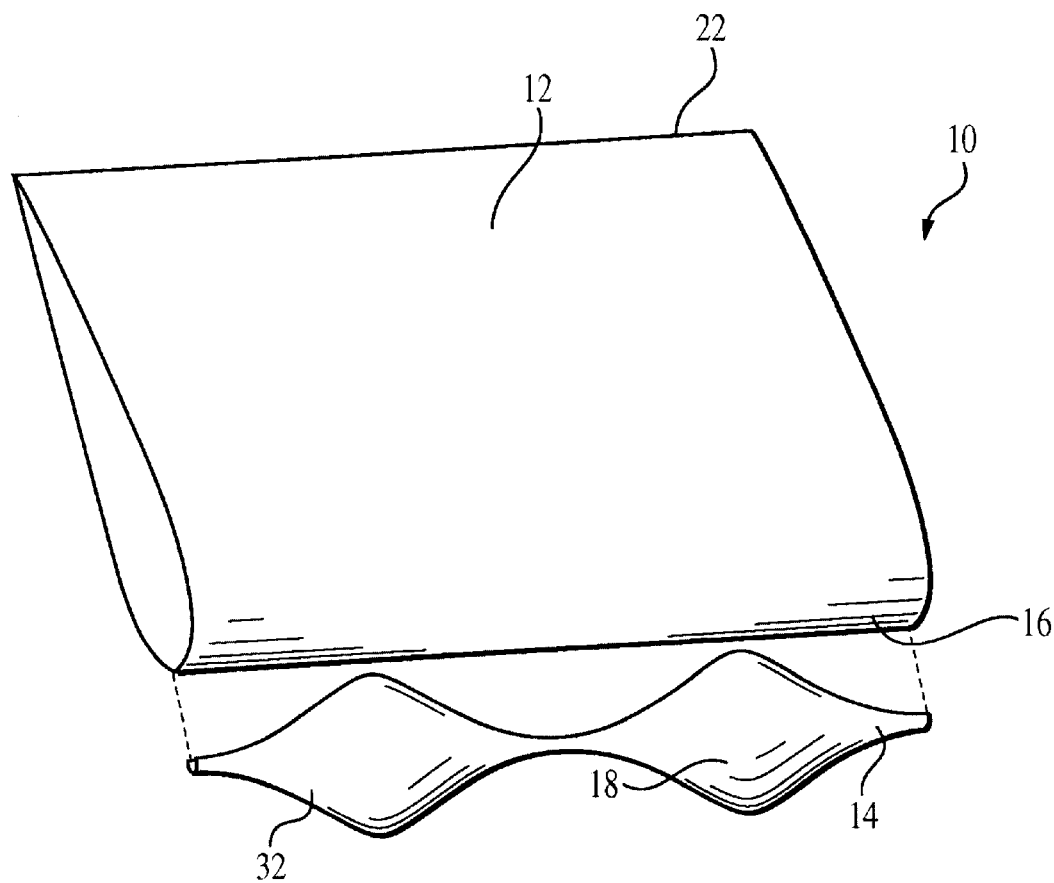
FIG. 1A is an exploded perspective view of a wing section under a first embodiment of the invention.
Figure 1B:
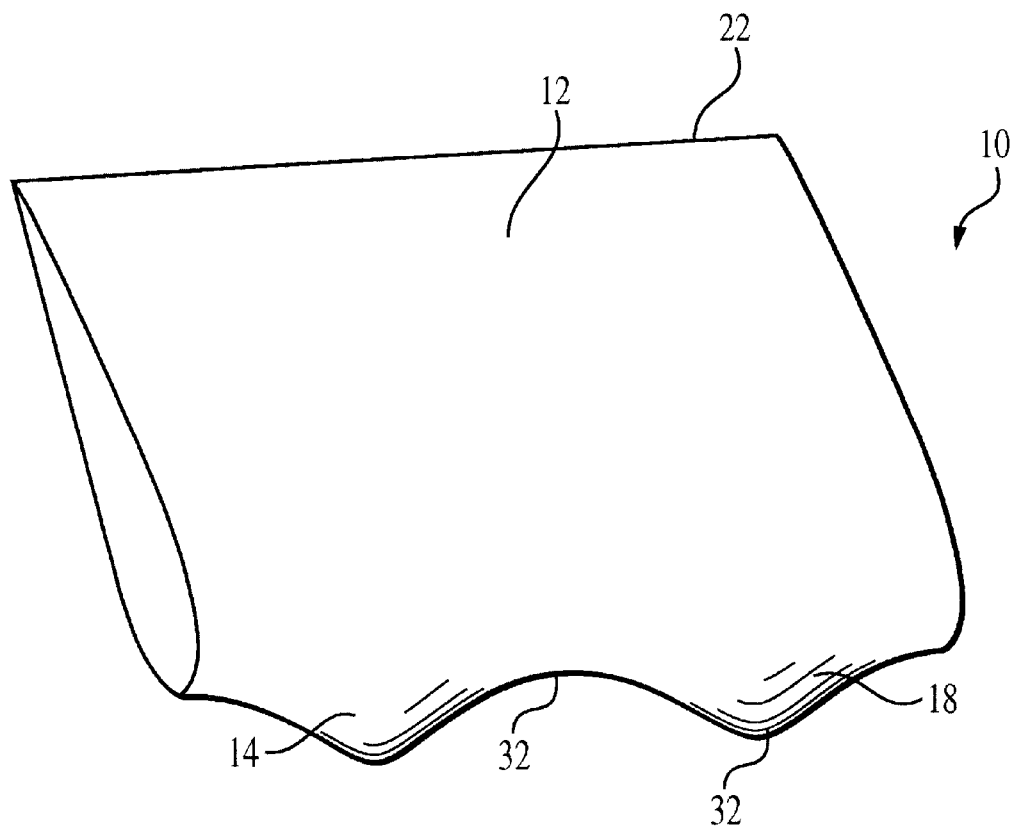
FIG. 1B is a perspective view of the wing section depicted in FIG. 1.

A section of a wing 10 according to one embodiment of the present invention is shown in FIGS. 1A and 1B. The wing is a laterally extending body having a laterally extending primary portion 12 and a laterally extending leading portion 14. The primary portion forms an unswept wing characterized by a constant chord and cross-sectional airfoil shape, and by a straight, laterally extending leading edge 16. The leading portion of the body is disposed along the leading edge of the primary portion, and is scalloped, i.e., it forms protrusions 18 that extend forward significantly from the leading edge.

The wing 10 can be configured for a broad array of functions. Many typical vehicles, such as aircraft, watercraft (both surface and submersible), and land vehicles, use horizontal, vertical and/or canted wings for creating lift, stabilizing airflow, maneuvering, and/or creating other aero- and/or hydrodynamic forces. Similarly, various apparatus that handle fluids (i.e., liquids or gasses), and particularly ones that handle large quantities of fluids, employ wing structures to direct the flow of the fluids, stabilize the fluids, measure the flow rate of the fluids, and other such functions.

With reference to FIGS. 1A—3B, the primary portion 12 of the wing 10 is constructed using conventional techniques for the type of wing that is being designed. For example, if the wing is being designed for a typical commercial aircraft, the wing will likely include one or more longitudinally extending spars, with a series of frames at longitudinally spaced locations along the spars, and a skin panel that is attached around the frames to form the exterior shape of the body. If the wing is being designed for a car spoiler, the primary portion will likely be a composite structure that is solid throughout.

Preferably, the cross-section of the primary portion 12 (depicted in FIGS. 3A and 3B) is characterized by an airfoil shape, with a rounded leading edge 16, a sharply pointed trailing edge 22, and a smoothly varying upper and lower camber 24 and 26, respectively, in between. The camber reaches its maximum thickness at approximately a quarter-chord or 30% chord location 28 (i.e., the maximum thickness of the primary portion is spaced from the leading edge by approximately 25% or 30% of the distance between the leading and trailing edges). Whether the upper and lower camber are symmetric to the chord line 30 will depend on the function that the wing is being designed for, as is known in the art.

As noted above, the leading portion 14 forms a series of protrusions 18 that define a leading edge 32 for the wing as a whole. It can be designed either as a single, unitary structure (as depicted) or as a plurality of parts (not shown). In the latter case, each part can include either a single protrusion or a plurality of protrusions. The leading portion is relatively small in comparison with the primary portion 12, and will typically be primarily supported by the support structure of the primary portion. Therefore, the leading portion will not be as likely to need spars, supports or exceptionally high strength materials that might well characterize the primary portion. Instead, it can be made to minimize weight and cost.

The method of attachment used to affix the leading portion 14 to the primary portion 12 will be selected from among the types of methods typically used for the particular application. On an aircraft wing, for example, the leading portion could be riveted to the primary portion at the longitudinal locations of the frames, with additional attachments at spaced intervals along the wing skin. Alternately, the primary portion and leading portion can be formed as a unitary member. This might be particularly desirable for simpler structures, such as that of a car spoiler. In such a case, there would be no need for an underlying primary structure with a leading edge. Instead, it could be one solid piece, or a wing with spars, frames, and other structures to support the scalloped leading-edge's shape.

Figure 2:
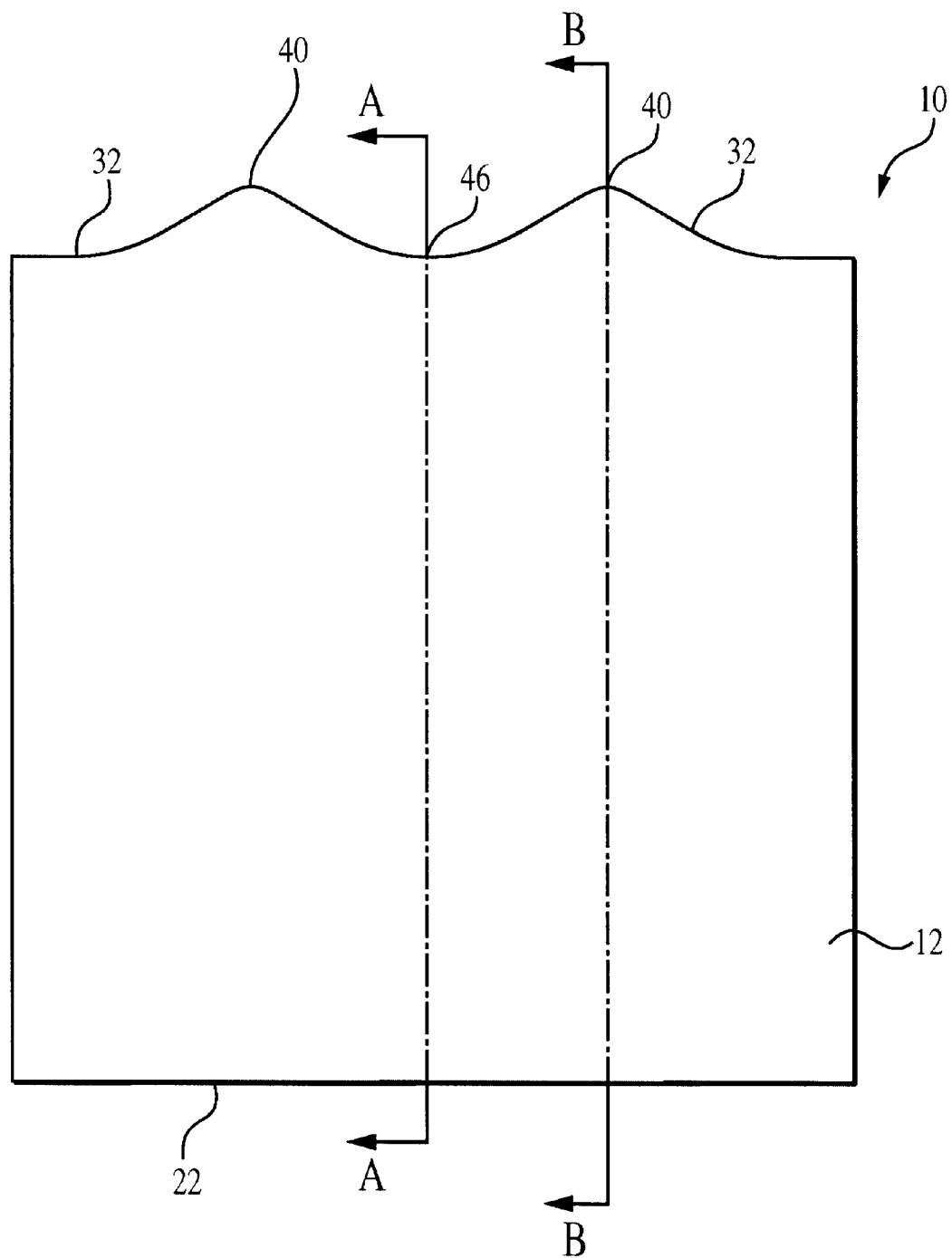
FIG. 2 is a plan view of the wing section depicted in FIG. 1
Figure 3A:
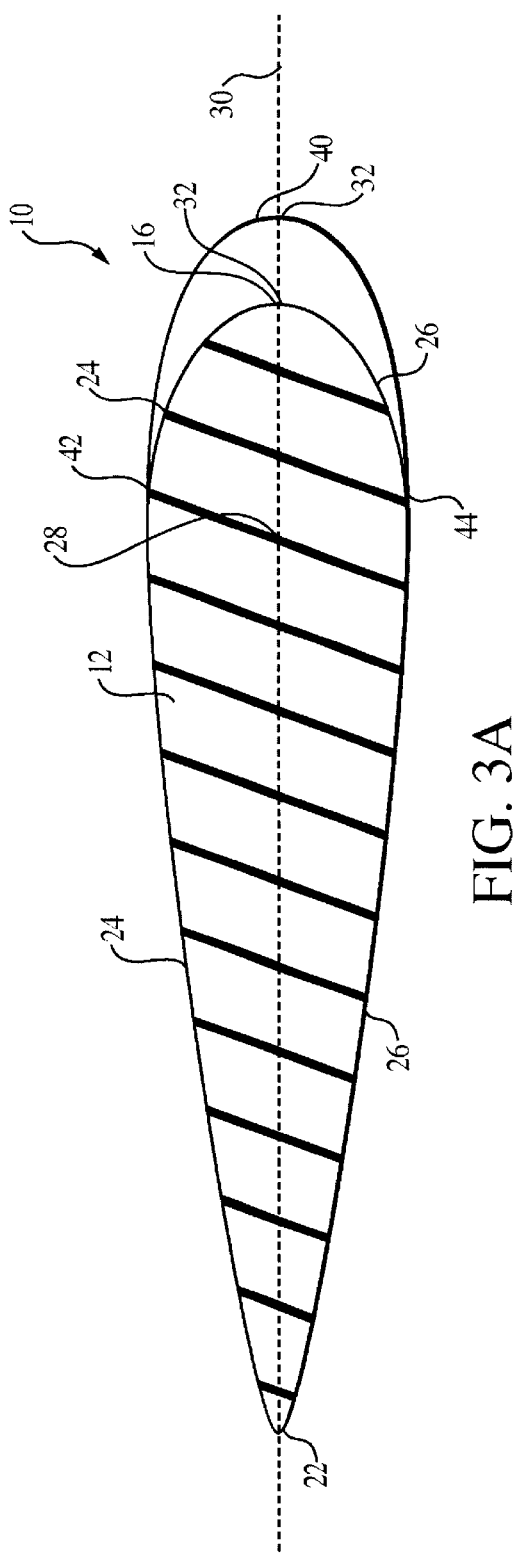
FIG. 3A is a cross-sectional side view of the wing section depicted in FIG. 1, taken along line A—A of FIG. 2.
Figure 3B:
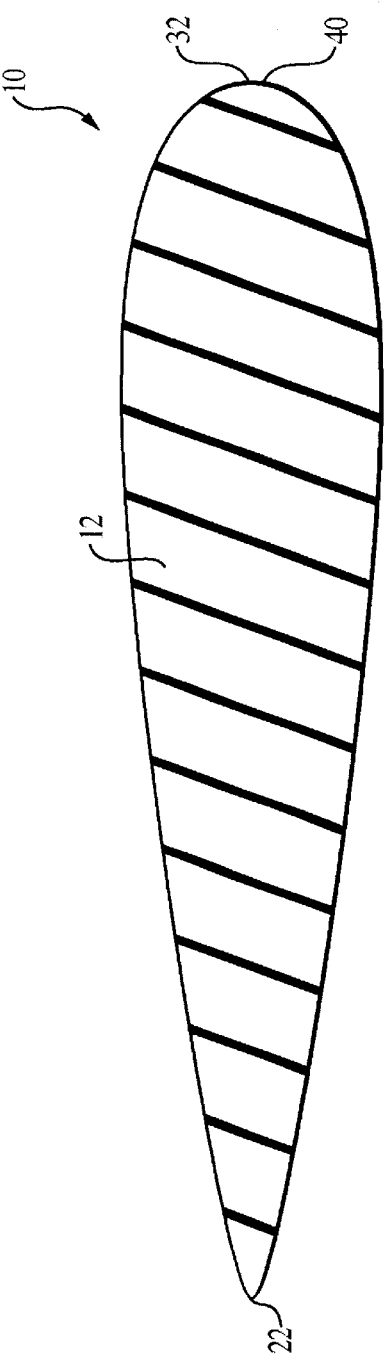
FIG. 3B is a cross-sectional side view of the wing section depicted in FIG. 1, taken along line B—B of FIG. 1.

As seen in FIGS. 2, 3A and 3B, at the longitudinal peak 40 of each protrusion 18 (i.e., the longitudinal location along the wing of the protrusion's fore-and-aft peak), the protrusion preferably extends back substantially to the points 42 and 44 at which the upper and lower cambers 24 and 26 reach their maximum height. This can occur at a different fore-and-aft position on the upper camber as opposed to the lower camber. Thus, the resulting upper and lower camber of the combined leading and primary portions is preferably an elongated variant of the primary portion's upper and lower camber.

At the bottom 46 of the fore-and-aft trough between each succeeding protrusion (see FIG. 2), optionally being laterally equidistant from the peak 40 of each protrusion, the leading portion 14 might add little to no shape to that of the primary portion 12. Thus, the resulting upper and lower camber of the combined leading and primary portions is preferably substantially the same as the primary portion's upper and lower camber. However, this might not be true near the root and/or tip of a wing that otherwise fits this description.

In between each trough 46 and peak 40, the wing's leading edge 32 varies in a fore-and-aft direction in an approximately smooth and oscillatory manner, thus creating an alternating forward and rearward sweep along the leading edge of the wing. The maximum fore-and-aft slope (i.e., change in fore-and-aft direction verses longitudinal location) of the leading edge reaches roughly the same magnitude on each side of each trough, although opposite in sign.

The forward extension distance that the leading portion 14 adds to the camber of the primary portion 12 varies smoothly, thus forming a smoothly varying set of forward protrusions on a wing that otherwise has a relatively constant chord and airfoil. However, it is to be understood that the invention can be applied to a wide variety of wings, including wings that already have varying chords, sweeps, and cambers. It is to be understood that application of the invention to a swept wing might lead to a wing with a leading edge having a leading edge sweep that repeatedly varies between smaller and larger values of the same sign. For example, a highly rearward-swept wing with small protrusions that extend forward and outward at an angle normal to the sweep of the wing might not have any forward-swept portion of its leading edge. Also, it should be clear that rearward-swept wings will likely have outboard protrusions located in a more rearward (i.e., downstream) position, and forward-swept wings will likely have outboard protrusions located in a more forward (i.e., upstream) position.

The longitudinal spacing and/or amplitudes (i.e., the distance that the fore-and-aft peak extends forward) of the protrusions preferably increases in a portion near a wing root and decrease in a portion near a wing tip (relative to more centrally located protrusions). The wing root and wing tip portions each commonly constitute 20–30% of the wing, the remaining 40–60% being a center portion. Wing roots and wingtips can sometimes be defined by changes in a wing's chord, camber, sweep and/or dihedral, as well as the placement of attached items such as pylons.

In the case of wings with decreasing chords (i.e., where the minimum chord between each adjacent pair of protrusions decreases), or with wings having wing sections that have decreasing chords, the protrusions preferably decrease in size corresponding to, and preferably proportional to (or otherwise related to), the decrease in chord, the decrease in maximum height, or some proportional/related combination of the two. Additionally, it is preferable that the distance between each peak and trough proportionately decrease, such that tapered wings have protrusions of increasing frequency and decreasing size.

Figure 4:
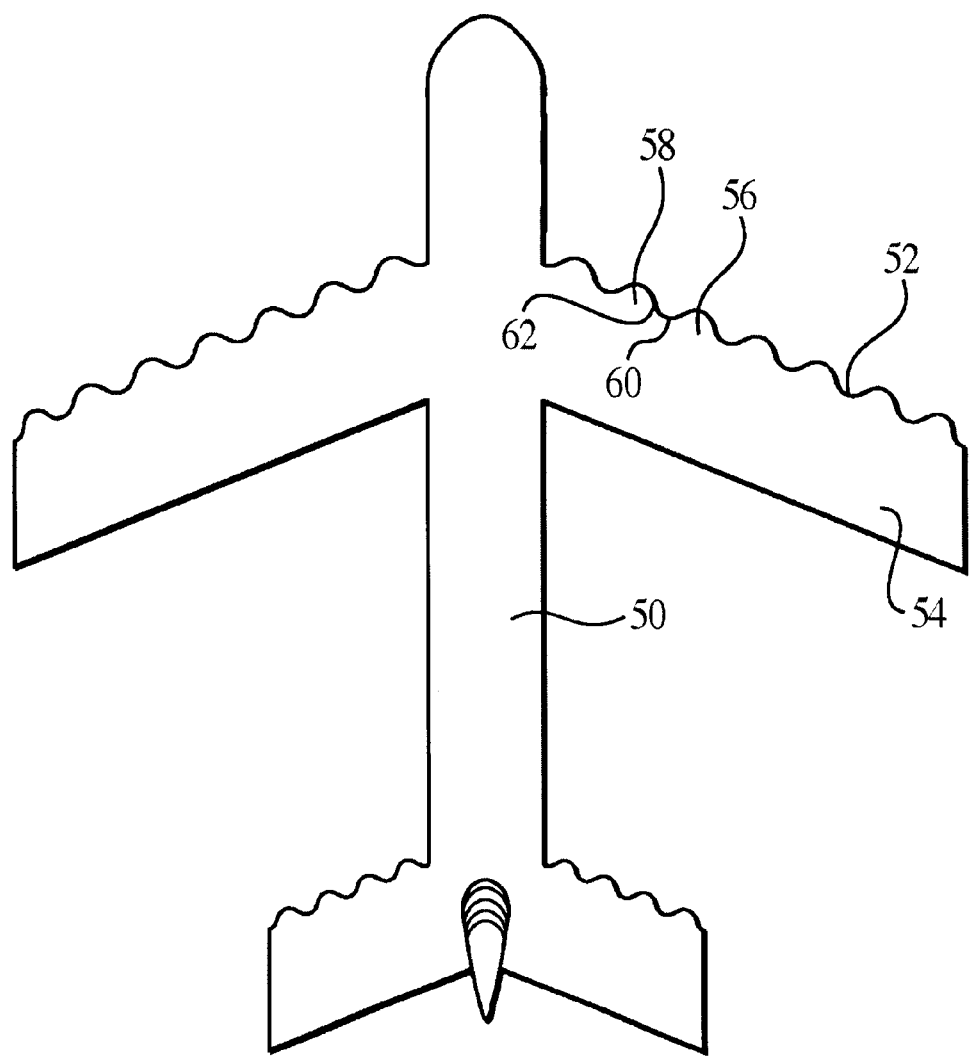
FIG. 4 is a plan view of an aircraft under a second embodiment of the invention, having a swept wing.

With reference to the aircraft 50 of FIG. 4, if the leading edge 52 of the primary portion 54 is swept back or forward (i.e., it is not zero), the wing forms pairs of adjacent protrusions where, relatively, one is aft 56 and one is forward 58. The lateral center point 60 of the fore-and-aft trough 62 preferably moves toward the aft protrusion 56, thus allowing the maximum fore-and-aft slope of the leading edge to reach at least roughly the same value on each side of each trough.

In experimentation, the present invention has proven to typically both increase lift and lower drag at relatively modest angles of attack up to 10°. Even when no increase in lift was detected near zero angle of attack, there continued to be no drag penalty. Thus, in experimentation the present invention has proven to consistently have an equal or higher lift over drag ratio, and incurs no penalty in wing performance. Other preferred embodiments are anticipated to likewise have this advantage.

It is believed that the present invention will likewise function at higher angles of attack, and that it will delay the onset of stall through these higher angles of attack, thereby extending the useful operating envelope of lifting surfaces and control surfaces.

The present invention appears to function by altering the typical aero- or hydrodynamics occurring over an airfoil. In particular, in cross-section a typical airfoil will have a stagnation point on the leading edge, where the fluid particles have zero velocity with respect to the airfoil. In front of the stagnation point is a stagnation region, where the fluid has negligible relative velocity. The reduction of the relative speed to zero creates a significant pressure on the wing, and therefore, a significant amount of drag. On a typical wing, a line of stagnation points are thus present longitudinally along the leading edge of the wing, creating a line of high static pressures along the leading edge of the wing. Airfoil drag in a viscous fluid can be reduced by decreasing the size and strength of high static pressure regions. In other words, lower leading edge static pressures improve airfoil leading edge suction. In the present invention, preferably one stagnation point exists at each peak and trough along the leading edge, while the remainder of the leading edge experiences lower static pressures.

From the foregoing description, it will be appreciated that the present invention provides an apparatus for improving the efficiency of a wing, and to related methods. While a particular form of the invention has been illustrated and described, it will be apparent that various modifications can be made without departing from the spirit and scope of the invention. Furthermore, it is understood that a wide range of applications exist, such as for aircraft, water craft and land vehicles, including rudder leading edges, submarine dive planes and conning towers, sailboat keels, sailboat masts, spoilers, stators, rotors, fans and various appendages. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

We claim:

1. An apparatus, comprising a laterally extending wing with an upper and a lower camber, the wing defining a longitudinal upstream direction, a chord at any given lateral location, and a laterally extending leading edge facing in the upstream direction, the upper and lower camber each having a point of maximum height with respect to the chord at any given lateral location along the wing, wherein:

laterally along the wing, the leading edge smoothly varies sweep in alternately forward and aft directions to define forward-extending leading edge protrusions with longitudinal peaks and troughs; and laterally along the wing, the height of the upper camber at its point of maximum height with respect to the chord does not alternately increase and decrease in size corresponding with the protrusion peaks and troughs.

2. The apparatus of claim 1, wherein the protrusions are separable from the remainder of the wing.

3. The apparatus of claim 2, wherein the remainder of the wing that is separable from the protrusions defines a leading edge that does not create a smoothly varying alternately forward and aft sweep relative to the upstream flow direction along the leading edge.

4. The apparatus of claim 1, wherein the protrusions are unitary with the remainder of the wing.

5. The apparatus of claim 1, wherein at any given location laterally along the wing, the protrusions increase the thickness of the remainder of the wing only between the leading edge of the wing and substantially the point of maximum wing thickness with respect to the chord.

6. The apparatus of claim 1, wherein the protrusions extend back only to substantially the point of maximum wing thickness with respect to the chord.

7. The apparatus of claim 1, wherein the minimum chord between pairs of adjacent protrusions decreases in a lateral direction, and wherein the protrusions decrease in size corresponding to the decrease in minimum chord in the lateral direction.

8. The apparatus of claim 1, wherein the minimum chord between pairs of adjacent protrusions decreases in a lateral direction, and wherein the distance between protrusion peaks and adjacent troughs decrease in size corresponding to the decrease in minimum chord in the lateral direction.

9. The apparatus of claim 1, wherein:

the wing has a first portion at a root of the wing, a second portion at a tip of the wing, and a third portion spanning between the first and second portions, the third portion being larger than the first and second portions;

the distance between protrusion peaks and adjacent troughs is substantially similar throughout the third portion; and on the first and third portions, the distance between protrusion peaks and adjacent troughs varies from the distance between protrusion peaks and adjacent troughs of the second portion.

10. The apparatus of claim 9, wherein the amplitude of the protrusions in the first portion is larger than the amplitude of the protrusions in the second portion.

11. The apparatus of claim 1, wherein the maximum fore-and-aft slope of the leading edge is approximately equal on either side of troughs between adjacent protrusions.

12. The apparatus of claim 1, wherein the maximum fore-and-aft slope of the leading edge differs from one side to the other of troughs between adjacent protrusions.

13. The apparatus of claim 12, wherein the wing has a nonzero sweep such that each pair of adjacent protrusions has one protrusion farther downstream along the span.

14. The apparatus of claim 1, wherein some of the protrusions are part of a slat mechanism.

15. The apparatus of claim 1, wherein the protrusions extend back along the upper camber to substantially the point of upper camber maximum height with respect to the chord.

16. The apparatus of claim 1, wherein laterally along the wing, the height of the lower camber at its point of maximum height with respect to the chord does not alternately increase and decrease in size corresponding with the protrusion peaks and troughs.

17. The apparatus of claim 16, wherein at any given location laterally along the wing, the point of maximum height of the upper and lower cambers with respect to the chord occurs at the same location along the chord.

18. The apparatus of claim 17, wherein the protrusions extend back along the lower camber to substantially the point of lower camber maximum height with respect to the chord.

19. The apparatus of claim 18, wherein the protrusions extend back along the upper camber to substantially the point of upper camber maximum height with respect to the chord.

20. The apparatus of claim 1, wherein at any given location laterally along the wing, the upper and lower cambers are symmetric to the chord line.

21. An apparatus, comprising a laterally extending wing with an upper and a lower camber, the wing defining a longitudinal upstream direction, a chord at any given lateral location, and a laterally extending leading edge facing in the upstream direction, the upper and lower camber each having a point of maximum height with respect to the chord at any given lateral location along the wing, wherein:

the leading edge includes a means for causing longitudinal fluid flow to smoothly vary in alternate directions along the leading edge such that stagnation occurs only at selected points along the leading edge where the direction of the longitudinal fluid flow changes; and laterally along the wing, the height of the upper camber at its point of maximum height with respect to the chord does not alternately increase and decrease in size corresponding with the protrusion peaks and troughs.

22. An apparatus configured for attachment to a laterally extending wing with an upper and a lower camber, the wing defining a longitudinal upstream direction, a chord at any given lateral location, and a laterally extending leading edge facing in the upstream direction, the upper and lower camber each having a point of maximum height with respect to the chord at any given lateral location along the wing, comprising:

a wing-extension configured to be received over the leading edge of the wing such that it forms a laterally extending leading edge facing in the upstream direction;

wherein laterally along the wing, the wing-extension leading edge smoothly varies sweep in alternately forward and aft directions to define forward-extending leading edge protrusions with longitudinal peaks and troughs; and wherein laterally along the wing, the wing-extension does not extend back along the upper camber past the point of upper camber maximum height with respect to the chord.

23. The apparatus of claim 22, wherein laterally along the wing, the protrusions increase the thickness of the wing only between the leading edge of the wing and substantially the point of maximum thickness with respect to the chord.

24. The apparatus of claim 22, wherein the protrusions extend back only to substantially the point of maximum wing thickness with respect to the chord.

25. The apparatus of claim 22, wherein some of the protrusions are part of a slat mechanism.

26. A method of configuring a wing to exhibit an increased lift over drag performance, wherein the wing is laterally extending with an upper and a lower camber, and the wing defines a longitudinal upstream direction, a chord at any given lateral location, and a laterally extending leading edge facing in the upstream direction, the upper and lower camber each having a point of maximum height with respect to the chord at any given lateral location along the wing, comprising:

mounting a leading edge wing-extension over the leading edge of the wing such that it forms a laterally extending leading edge facing in the upstream direction;

wherein laterally along the wing, the wing-extension leading edge smoothly varies sweep in alternately forward and aft directions to define forward-extending leading edge protrusions with longitudinal peaks and troughs; and wherein laterally along the wing, the wing-extension does not extend back along the upper camber past the point of upper camber maximum height with respect to the chord.

27. An aircraft comprising a laterally extending wing with an upper and a lower camber, the wing defining a longitudinal upstream direction, a chord at any given lateral location, and a laterally extending leading edge facing in the upstream direction, the upper and lower camber each having a point of maximum height with respect to the chord at any given lateral location along the wing, wherein:

laterally along the wing, the leading edge smoothly varies sweep in alternately forward and aft directions to define forward-extending leading edge protrusions with longitudinal peaks and troughs; and laterally along the wing, the height of the upper camber at its point of maximum height with respect to the chord does not alternately increase and decrease in size corresponding with the protrusion peaks and troughs.

28. The aircraft of claim 27, wherein the maximum fore-and-aft slope of the leading edge is approximately equal on either side of troughs between adjacent peaks.

29. The aircraft of claim 28, wherein the wing has a nonzero sweep such that each pair of adjacent protrusions has one protrusion further downstream along the span.

* * * * *